United States Patent Office 3,552,926
Patented Jan. 5, 1971

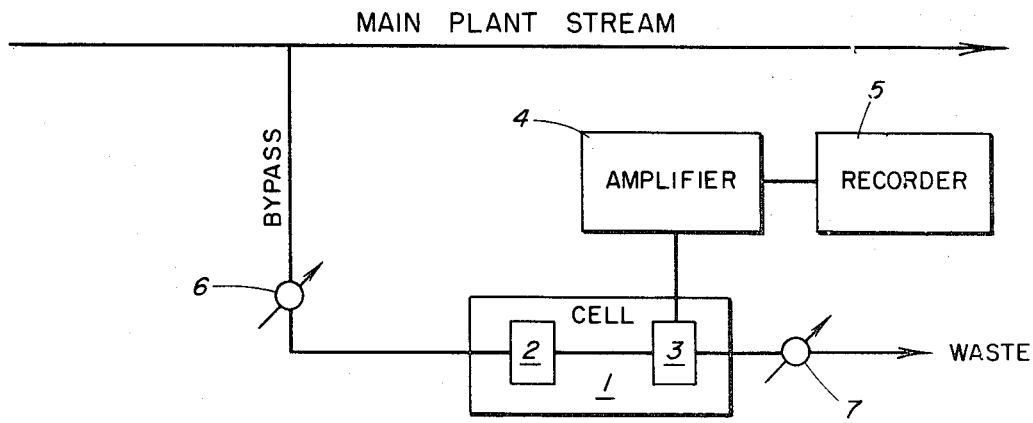

---

3,552,926
PROCESS FOR CONTINUOUS ANALYSIS OF NITROGLYCERIN AND RELATED NITRATE ESTERS
Mae I. Fauth, Oxon Hill, and Annie C. Richardson, Eastover, Md., assignors to the United States of America as represented by the Secretary of the Navy
Filed Dec. 10, 1968, Ser. No. 782,564
Int. Cl. G01n 21/20
U.S. Cl. 23—230                   7 Claims

ABSTRACT OF THE DISCLOSURE

A continuous method for determining the stability of nitroglycerin by detecting the presence of nitrite ion through a color test which consists of adding to the nitrate ester a color producing reagent such as a Griess type reagent, containing (1) sulfanilic acid, and (2) 1-naphthylamine, 1-naphthylamine oxalate or N-(1-napthyl)ethylenediamine dihydrochloride and detecting the color change.

BACKGROUND OF THE INVENTION

This invention relates generally to a method for determining the stability of nitrate esters and more particularly that of nitroglycerin.

Nitroglycerin, since it was first made, has always been difficult to work with, largely due to its great sensitivity to shock. Because of this property, the material is either kept at low temperatures where its sensitivity to shock is less or stabilized with compounds such as siliceous earth. This latter mixture is commonly referred to as dynamite. It is therefore also a problem to prepare nitroglycerin because of the possibility of detonation while being formed. Accorringly, methods have been devised to test the stability of nitroglycerin during its preparation.

One of these methods involves the use of the potassium iodide test in which three test tubes containing two milliliters each of the sample nitroglycerin are placed in a bath maintained at 82.2° C. for at least ten minutes or until blue coloration develops. Strips of standard potassium iodide-starch paper are suspended in the space above the liquid in the tube and then wet with a 50% solution (by volume) of glycerin in water.

The series of reactions involved in the potassium iodide test has been described by Feigl in Spot Tests in Inorganic Analysis, 5th ed., Elsevier (1958), on pages 331 and 332, to be as follows:

$$RONO_2 \rightarrow RO\cdot + NO_2$$

$$H_2O + 2NO_2 \rightarrow HNO_3 + HNO_2$$

$$2NO_2^- + 2I^- + 4H^+ \rightarrow I_2 + 2H_2O + 2NO$$

The sample passes the test if the color development time of the strip is in excess of ten minutes. The total testing time for his procedure lasts approximately forty minutes. The heating step and the extended testing time make this operation both hazardous and time consuming and it also requires that large quantities of newly manufactured nitroglycerin be held in holding tanks pending the completion of the laboratory tests.

SUMMARY OF THE INVENTION

Accordingly, an object of the invention is to provide a safe, speedy, accurate and continuous method for testing the stability of nitrate esters.

Another object of this invention is to provide a safe, speedy, accurate and continuous method for testing the stability of nitroglycerin.

Briefly, in accordance with one embodiment of this invention, these and other objects are obtained by constructing a bypass off the main stream of freshly prepared nitroglycerin, and connecting the bypass to a colorimeter. The testing is effected by the addition of a color producing reagent into the bypass line which reacts with the available nitrite ion, a decomposition product of the niroglycerin, and produces a color change which is measured by a colorimeter. A recorder or an alarm system may be connected to the colorimeter so that a given response from the colorimeter either will be plotted graphically or will actuate an alarm system to warn of the decomposed state of the nitroglycerin.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawing wherein the solitary figure is a diagrammatic illustration of the colorimeter.

DESCRIPTION OF THE PREFERRED EMBODIMENT

Referring now to the figure, the colorimeter is shown as consisting essentially of a sample cell 1 containing a light source 2 and a photocell detector 3, and amplifier 4 and a recorder 5. The colorimeter also contains two valves 6 and 7 which, when closed, separate the bypass from the main stream and retain the sample for test purposes. The cell itself is fabricated from a single piece of stainless steel and is designed so that no cracks, crevices, or imperfections exist in its structure as these crevices would collect small quantities of nitroglycerin and constitute a safey hazard. For this reason too, all inlets and outlets such as drilled holes which extend into the basic part in addition to all joints are welded solid. The washers used in the cell are gum rubber washers and not made of polyethylene as required by safety considerations.

The colorimeter operates in accordance with this invention by passing collimated light into the sample compartment located between the light source and the photocell detector and through which the sample is continuously flowing. The amount of light passing through the sample to the detector diminishes as the intensity of the color in the sample stream increases. The phototube in the detector measures the amount of transmitted light and generates a signal which is amplified in the control unit to operate a recorder, or if desired an alarm circuit.

Various color-forming reagents may be used to detect the presence of nitrite ion. One of these is the Griess reagent which contains 1-naphthylamine and sulfanilic acid. This reagent was prepared by the method of Feigl as disclosed in Spot Tests in Inorganic Analysis. The test involves the following reactions:

(a) Diazotization of sulfanilic acid

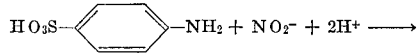

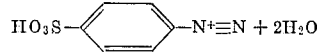

(b) Coupling with 1-naphthylamine

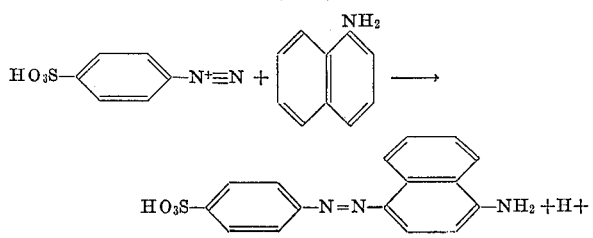

Another reagent which may be used consists of 1-naphthylamine oxalate and sulfanilic acid. The oxalate was prepared as given by F. L. Hahn in Mikrochemie, 3, 31 (1931). This reacts in a manner similar to the Griess type reagent and involves two reactions: the diazotization of the sulfanilic acid and the coupling of the diazo salt with the amine.

Still another reagent is Saltzman's reagent, N-(1-naphthyl)ethylenediamine dihydrochloride, the preparation of which is given in Anal. Chem., 26, 1949 (1954). This reacts similarly to the amine of the previous examples and also forms a red dye.

The colored products formed by the aforementioned reagents all absorb light at discrete and different frequencies as indicated in the Table I, show below.

TABLE I

| Reagent: | Maxima (m$\mu$) |
|---|---|
| Griess' reagent | 490–500 and 328 |
| 1-naphthylamine oxalate | 533 and 347 |
| N-(1-naphthyl)ethylenedamine dihydrochloride | 550 |

If the color is of an objectionable color as indicated by the intensity of light transmitted at any of the above frequencies the preparation of the nitroglycerin is either stopped or slowed down with a decrease in operating temperature as well as an addition of stabilizers. Maximum limits of nitrite ion to be tolerated are determined by Military Specification Nitroglycerin MIL-N-264B Feb. 19, 1962, which is based on the potassium iodide test.

After the nitroglycerin has been check for stability, the sample now contaminated by reagent and reaction products is transmitted to a catch tank for waste where it is desensitized by addition of acetone or other suitable agents.

Since there would be a risk of explosion in trying this color test in actual plant operation, a small scale laboratory experiment was first conducted on a noncontinuous basis to examine the limits of sensitivity of the various color producing reagents. The general procedure was to weigh nitroglycerin into 25 ml. flasks equipped with cork stoppers and maintained in a constant temperature bath. Reagent papers were then prepared by saturating Number 41 Whatman filter paper in a dish of the desired reagent for five minutes. The reagent itself was prepared daily. however refrigeration can be used to keep it unreactive for periods not exceeding 24 hours. Another piece of filter paper is used to remove the excess reagent. The paper, after being dried overnight in a vacuum desiccator containing silica gel, was cut into strips and stored in a brown screw-cap container. As an alternative, the reagent solution was added directly to the nitroglycerin in amounts of approximately 10 ml. of reagent per gram of nitroglycerin.

The tests were carried out with the nitroglycerin in direct contact with the reagent or the reagent paper. The absorbance of the samples was measured at five-minute intervals for a thirty-minute period by a Bausch and Lomb Spectronic 505 with a 1 cm. cell at the wavelength maxima shown in Table I. The first definite visible color produced was recorded as a positive result. During the testing, temperature was varied from 25 to 50° C. to measure the effect of temperature on the decomposition which is shown in Table II. However, at room temperature, the samples were first shaken gently for thirty seconds to ensure proper mixing and allowed to stand for an additional 1½ minutes. The concentration of $NO_2$, which is of course a measure of the decomposition of the nitroglycerin, was determined from a previously constructed curve of absorbance versus concentration of $NO_2$ using sodium nitrite as the standard. Details of this method is described by Saltzman in Anal. Chem., 26, 1949 (1954).

TABLE II

| Sample wt. of N.G. (g.) | Temp. (° C.) | Absorbance |
|---|---|---|
| 0.5 | 25 | 0.005 |
| 0.5 | 35 | 0.013 |
| 0.5 | 40 | 0.015 |
| 0.5 | 50 | 0.017 |
| 1.0 | 25 | 0.013 |
| 1.0 | 35 | 0.022 |
| 1.0 | 40 | 0.028 |
| 1.0 | 50 | 0.029 |

In order to obtain samples which correspond to low-stability nitroglycerin, compositions were prepared by adding known amounts of nitrogen dioxide to nitroglycerin. The absorbance then is measured after the color producing agent has been added and a color has become apparent.

The following examples are intended to illustrate several characteristic reagent compositions, however these examples are not intended in any way to limit the scope of the invention but are merely exemplary.

EXAMPLE I 1-naphthylamine—.03 g.[1]
sulfanilic acid—1 g.
acetic acid—100 ml. of 30% acetic acid
detection limit—0.01 g. of nitrous acid

EXAMPLE II 1-naphthylamine oxalate—.03 g.[1]
sulfanilic acid—1 g.
acetic acid—100 ml. of 30% acetic acid
detection limit—unknown

EXAMPLE III

N-(1-naphthyl)methylenediamine dihydrochloride 20 ml. of a .1% aqueous solution diluted to a liter
sulfanilic acid—5 g.
acetic acid—140 ml. of glacial acetic acid in 1 liter of water
detection limit—few parts per billion In all of the above examples, when water is required, it must be nitrite-free. This is usually accomplished by double distilling the water. Also, because 1-naphthylamine is only partially soluble in water it is added to the acidified water in the amount described in Example I and the resulting solution boiled. Since the amine which does not dissolve is filtered off and discarded, it is present in an amount slightly less than the specified amount of .03 g.

Of the three color producing reagents, N-(1-naphthyl)ethylenediamine dihydrochloride is preferred as it is the most sensitive since it is capable of detecting 0.01 $\mu$l. of nitrite ion. It is to be remembered that in performing this colorimetric test for measuring nitrate ester stability, certain variables which may effect the experimentally observed amount of nitrite ion must be standardized. These variables include the time of color development, temperature at which the color is developed, the size of the nitroglycerin sample as well as the presence of any moisture.

Another embodiment of this invention is to include with the color producing agent a solvent in which both the agent and the nitroglycerin is soluble. In this way,

---

[1] Dissolved in a solution of 70 ml. of $H_2O$ and 30 ml. of glacial acetic acid.

the reactants will mix better causing the color to develop faster in the presence of available nitrite ions. Typical examples of such solvents include methyl alcohol, ethyl alcohol, benzene, chloroform, carbon tetrachloride, methylene chloride and ethylene glycol among others.

Although the color producing reagents are used primarily to detect the decomposition of nitroglycerin, they may also be used with other liquid nitrate esters such as propylene glycol dinitrate, butylene glycol dinitrate and triethylene glycol dinitrate because the principal decomposition product would be the same, namely nitrite ions. In addition, other acids such as hydrochloric acid may be employed instead of acetic acid to provide $H^+$ ions necessary for diazotizing the sulfanilic acid.

Obviously, many other modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A continuous method for colorimetrically determining the stability of a nitrate ester in plant production by detecting the presence of nitrite ions which comprises the steps of:
   adding to said nitrate ester in a bypass separated from the main stream a color producing reagent which comprises sulfanilic acid in an acidic media and an amine coupling reagent taken from the group consisting of 1-naphthylamine, 1-naphthylamine oxalate and N-(1-naphthyl)ethylenediamine dihydrochloride, and
   detecting changes in the color in said nitrate ester solution.

2. A continuous method according to claim 1 wherein said nitrate ester is nitroglycerin.

3. A continuous method according to claim 2 wherein said acidic media is provided for by the addition of acetic acid.

4. A continuous method according to claim 2 in which said color producing reagent is dissolved in a solvent capable also of dissolving said nitroglycerin before the addition of the color producing reagent to the nitroglycerine.

5. A continuous method according to claim 2 wherein said amine coupling reagent is 1-naphthylamine.

6. A continuous method according to claim 2 wherein said amine coupling reagent is 1-naphthylamine oxalate.

7. A continuous method according to claim 2 wherein said amine coupling reagent is N-(1-naphthyl)ethylenediamine dihydrochloride.

References Cited

UNITED STATES PATENTS

| 2,960,389 | 11/1960 | Zihlman | 23—230 |
| 3,375,079 | 3/1968 | Lyshkow | 23—232 |

OTHER REFERENCES

C.A. (I) 53:831d (1959).
C.A. (II) 64:19306c (1966).
James C. Munch et al., J. of Pharm. Sci., 53(7), 832–3 (1964).
E. Sawicki et al., Anal. Chem., 34(2) 217–8 (1962).
F. Feigl, "Spot Tests in Organic Analysis," 484, Elsevier Publishing Co., New York, 1956.

MORRIS O. WOLK, Primary Examiner

S. MARANTZ, Assistant Examiner

U.S. Cl. X.R.

252—408